United States Patent [19]

Fiedler et al.

[11] 3,979,010
[45] Sept. 7, 1976

[54] FUEL TANK FOR A MOTOR VEHICLE
[75] Inventors: Horst Fiedler, Stuttgart; Walter Schuller, Winnenden-Schelmenholz; Manfred Distel, Ruit, all of Germany
[73] Assignee: Daimler-Benz Aktiengesellschaft, Germany
[22] Filed: July 12, 1974
[21] Appl. No.: 488,157

[30] Foreign Application Priority Data
July 17, 1973 Germany.................. 2336239

[52] U.S. Cl.................. 220/86 R; 141/286; 141/392
[51] Int. Cl.² .................. B65B 1/04
[58] Field of Search ........ 141/286, 392; 138/39, 138/121, 173; 220/86 R, 85 F

[56] References Cited
UNITED STATES PATENTS

| 607,620 | 7/1898 | Kemp | 138/173 |
|---|---|---|---|
| 1,437,916 | 12/1922 | Shelon | 141/45 |
| 1,488,865 | 4/1924 | Castor | 215/307 |
| 1,519,728 | 12/1924 | Furen | 220/86 R |
| 2,138,104 | 11/1938 | Kellogg | 220/86 R |
| 2,206,948 | 7/1940 | Frankfond | 220/86 R |
| 2,247,509 | 7/1941 | Lebus | 220/86 R |
| 2,319,567 | 5/1943 | Vegell | 220/86 R |
| 3,060,069 | 10/1963 | Sindars | 138/121 |
| 3,133,564 | 5/1964 | Hunter | 220/86 R |
| 3,148,713 | 9/1964 | Jones, Jr. | 141/286 |
| 3,448,892 | 6/1969 | Thieman | 220/86 R |
| 3,477,611 | 11/1969 | Niles | 220/86 R |
| 3,543,484 | 12/1970 | Davis | 141/286 |
| 3,643,690 | 2/1972 | Saral | 220/86 R |
| 3,872,900 | 3/1975 | Gotz | 220/86 R |

FOREIGN PATENTS OR APPLICATIONS
403,967 12/1933 United Kingdom ........... 220/86 R Primary Examiner—George E. Lowrance
Assistant Examiner—Allan N. Shoap
Attorney, Agent, or Firm—Craig & Antonelli

[57] ABSTRACT

A fuel tank of a motor vehicle, in which the filter pipe terminates to one side of its rear wall at the top thereof; the filler pipe includes sections extending in horizontal and inclined planes and is provided with an inlet opening adapted to be closed by a closure lid and intended for the insertion of the discharge pipe; the discharge pipe thereby rests against the lower edge of the inlet opening, when filling the tank, while its upper nozzle surface abuts at a support plate, whereby a vent pipe terminates in the filler pipe downstream of the support plate; the discharge edge of the discharge pipe is thereby adapted to abut at the lower inner wall of the rear, straight and obliquely upwardly extending section of the filler pipe which is provided with an indentation directly downstream of this support place of the discharge edge of the discharge pipe in order to assure an unimpaired inflow of the fuel; the support plate, in its turn, leaves sufficiently large open areas for the passage of air, especially of air flowing out through the vent pipe.

5 Claims, 3 Drawing Figures

FUEL TANK FOR A MOTOR VEHICLE

The present invention relates to a fuel tank of a motor vehicle, in which the filler pipe terminates on one side of the rear wall of the tank at the top thereof, which filler pipe includes sections extending in horizontal planes and obliquely thereto and whose closure socket is provided with an opening intended for the insertion of the discharge pipe, whereby the larger internal dimension of the opening extends in a horizontal plane and the discharge pipe rests against the lower edge of the opening, when filling the tank, while the upper outer surface of the discharge pipe thereby abuts at a sheet metal support member, downstream of which—as viewed in the flow direction of the fuel—terminates a vent line in the filler pipe connection, and whereby the discharge edge of the discharge pipe may abut at the lower inner wall of the filler pipe.

With the hitherto known fuel tanks of this type, a back-up or backwash of the inflowing fuel always resulted in the filling pipe connection so that the feeler nozzle was acted upon and thus operated to turn off the fuel flow. It was therefore not possible to automatically fill up the tank of the motor vehicle with an average velocity of the presently customary filling velocities. The further configuration of the filler pipe as well as the insufficient possibility for the escape of the air forced out of the tank when filling the tank, also stood in the way of a more rapid tanking.

It is the aim of the present invention to avoid these disadvantages and to enable a rapid automatic filling of the fuel tank whereby a turning-off of the automatic discharge mechanism either by a fuel backup or by an excessively horizontal position of the discharge pipe is to be avoided. With the new types of passenger motor vehicle having fuel tanks above the rear axle in particular the rear, rectilinear end portion of the filler pipe is frequently very short by reason of the existing space conditions and has only a slight inclination. With the automatic dispensing mechanisms of pistol-type configuration of German and foreign manufacture which are normally used at gas stations, the automatic turn-off mechanism which becomes operable with a horizontal position of the pistol-like dispensing mechanism, automatically responds already with a somewhat flat position of the filler-pipe connection so that the dispensing mechanism has to be positioned at a greater inclination by a suitable installation. Additionally, it is to be prevented by an effective venting of the tank that the feeler nozzle is wetted by a liquid back-up in the first curved portion of the connecting pipe and therewith the fuel supply is turned off before the maximum fill-in quantity per time unit is reached. Additionally, it is the aim of the present invention to leave a sufficiently large distance between the handle portion of the pistol-like dispensing mechanism and the vehicle body outer paneling which assures that damages of the paint of the body surface are avoided. Furthermore, the filler pipe connection is to be so manufactured that it not only fulfills the conditions for an unobstructed and unimpaired automatic filling operation but also can be readily matched during the assembly and has at least one intended buckling place which during an accident assures a destruction-free deformation and thereby avoids the danger that during such an accident fuel will flow out and be spilled.

The underlying problems are solved according to the present invention in that for the unobstructed and unimpeded inflow of the fuel, the lower inner wall of the rear, straight and obliquely upwardly extending section of the filler pipe is provided with an indentation directly to the rear of the support place of the discharge edge of the discharge pipe, as viewed in the flow direction, and in that the plate-like sheet metal support member leaves free sufficiently large openings for the passage of the air which in particular flows through the vent pipe. According to a further feature of the present invention, the rear section of the filler pipe may be connected with the next following filler pipe section which extends in a horizontal plane and is connected obliquely at the rear section, by way of annular reinforcing corrugations. Also, further sections of the filler pipe may be connected with each other by means of annular reinforcing corrugations. An easy deformability of the filler pipe is ensured by the annular reinforcing corrugations and additionally an eddy flow of the fuel which just flows out of the discharge pipe, is caused by the filler pipe section connected obliquely at the rear section, which favors its smooth inflow into the tank. In order that no back-up results in the filler pipe, the interior cross section of the vent pipe should correspond advantageously at least to the cross section of the fuel jet leaving the discharge pipe.

Waves result within the fuel tank from the fuel which flows rapidly into the fuel tank downstream of the discharge orifice of the filler pipe, which in particular during the last period of the filling operation may lead to the fact that fuel flows back again in larger quantities through the vent pipe. This is avoided according to this invention in that the inlet portion of the vent pipe is arranged approximately in the center of the fuel tank and is conically enlarged. The conical enlargement may thereby be at a ratio of about 1 : 1.4 to about 1 : 1.6 with respect to the internal cross section of the vent pipe.

Accordingly, it is an object of the present invention to provide a fuel tank for a motor vehicle which avoids by simple means the aforementioned shortcomings and drawbacks encountered in the prior art.

Another object of the present invention resides in a fuel tank for a motor vehicle which permits rapid and complete filling of the tank without the danger that the automatic discharge mechanism will be automatically turned off due to a back-up of the inflowing fuel.

A further object of the present invention resides in a fuel tank for motor vehicles which not only permits a rapid automatic filling of the fuel tank but also ensures an unimpeded inflow of the fuel.

Still a further object of the present invention resides in a fuel tank which assures a destruction-free deformation of the filler pipe in case of an accident and which avoids thereby the danger of a fuel spill during such an accident.

Another object of the present invention resides in a fuel tank arrangement of the type described above which not only ensures greater safety but also favors the inflow of the fuel into the tank.

These and other objects, features and advantages of the present invention will become more apparent from the following description when taken in connection with the accompanying drawing which shows, for purposes of illustration only, one embodiment in accordance with the present invention, and wherein.

Figures 1, 2, 3:
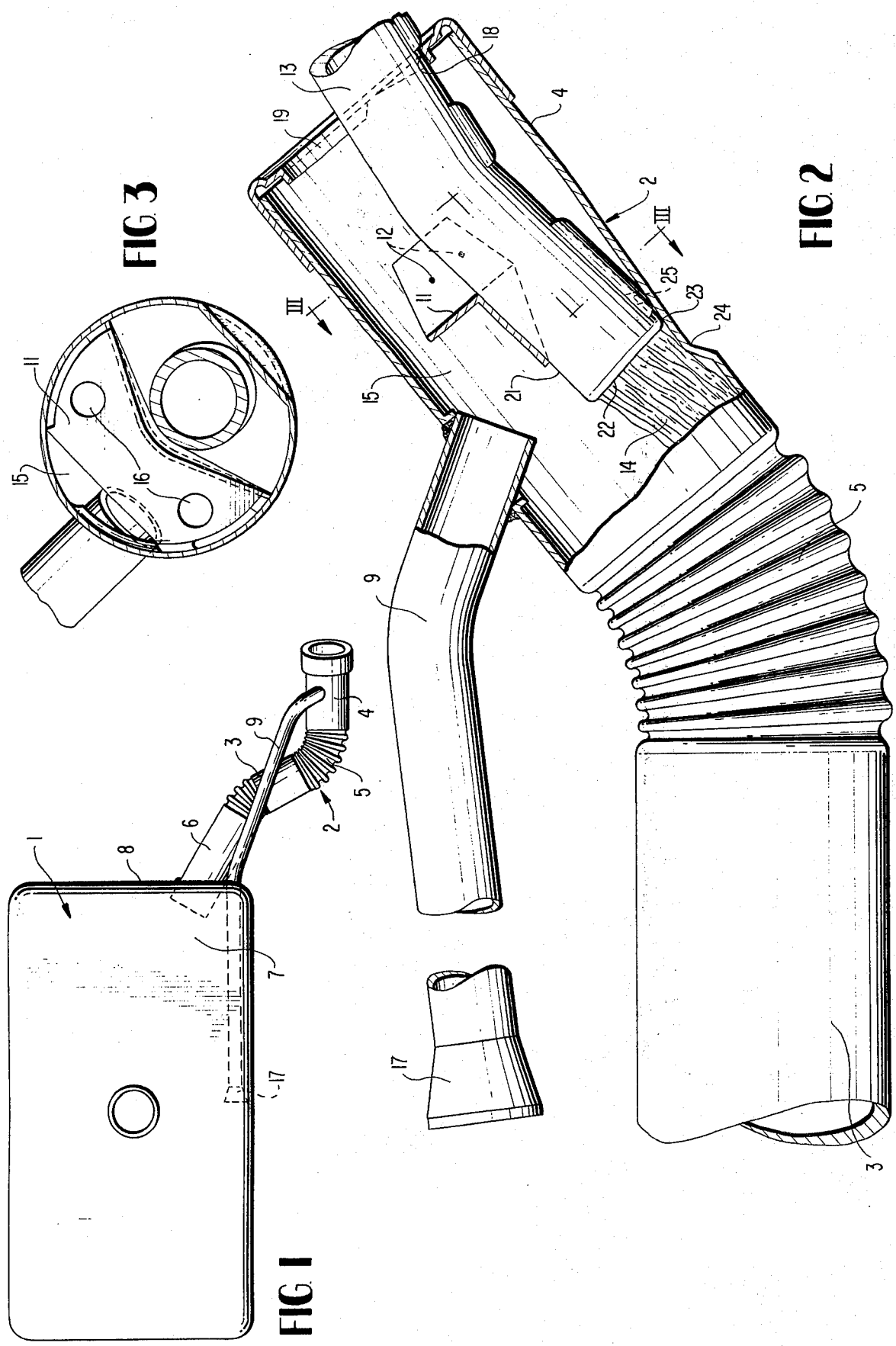
FIG. 1 is a top plan view on a fuel tank of a motor vehicle in accordance with the present invention.
FIG. 2 is an elevational view of a part of the filler pipe together with the vent pipe in accordance with the present invention, partly in cross section and on an enlarged scale.
FIG. 3 is a cross-sectional view, taken along line III—III of FIG. 2, and looking into the filler pipe.

Referring now to the drawing wherein like reference numerals are used throughout the various views to designate like parts, the fuel tank illustrated in FIG. 1 and generally designated by reference numeral 1 of a motor vehicle (not shown) includes a filler pipe generally designated by reference numeral 2 with a section 3 that extends in a horizontal plane and obliquely to the longitudinal direction of the tank, and a rear section 4 having a lesser inclination to the longitudinal direction. The horizontally extending section 3 of the filler pipe 2 includes at its two ends, annular reinforcing corrugations 5, by means of which it is connected, on the one hand, with the rear section 4 of the filler pipe 2 and, on the other, with the discharge section 6 of the filler pipe 2. The also horizontally extending discharge section 6 of the filler pipe 2 terminates in the tank near th upper boundary wall 7 of the fuel tank in the rear wall 8 thereof.

The fuel tank 1 is additionally connected with the filler pipe 2 by way of a vent pipe 9. The vent pipe 9 terminates in the rear, inclined section 4 of a filler pipe 2 shortly in front of a plate-like sheet-like metal support member 11 (FIG. 3) which is punched out of one piece and is fastened within the filler pipe 2 by means of lateral spot-welded points of connection 12 and extends transversely through the filler pipe 2 above the discharge pipe 13 of a fill nozzle. This support member 11 therefore leaves free significant cross-sectional areas of the filler pipe 2, namely, the circular segmental area 15 and the circularly shaped areas 16 for the passage of air. In order that the air escape out of the tank 1 during the filling thereof can also take place without impairment at the limit of the highest possible filling level, the vent pipe 9, on the other hand, is extended up to the center of the tank and terminates thereat in a conical enlargement 17 which abuts at the upper boundary wall 7 of the fuel tank 1. Whereas the inner diameter of the vent pipe 9 is about 16 mm. over the largest portion of its extent, which corresponds to the thickness of the fuel jet 14 leaving the discharge pipe 13, the largest diameter of the conical enlargement is between 17 and 25 mm.

As shown in FIG. 2, the discharge pipe 13 rests during the filling of the fuel tank, on the one hand, on the lower edge 18 of the fill-in opening 19 and, on the other, is supported, with its upper edge 21 at the support member 11. The discharge edge 22 of the discharge pipe 13 abuts at the lower inner wall of the filler pipe 2. As viewed in the flow direction of the inflowing fuel, the filler pipe 2 is provided with an indentation 24 directly to the rear of the support place 23 of the discharge edge 22 of the discharge pipe 13, i.e., downstream thereof, so that inflowing fuel 14 impinges against the inner wall of the filler pipe 2 only at a relatively larger distance downstream from the discharge edge 22. As a result thereof, no backwash or back-up of fuel can form and the sensor or feeler nozzle 25 remains dry until the tank is actually filled correctly.

The unimpaired discharge of the inflowing fuel is additionally favored in that the horizontally extending section 3 adjoins the rear section 4, which extends downwardly within a vertical plane so that the inflowing fuel is prompted into vortexing or eddying formation and facilitated discharge thereof is ensured thereby.

As a result of the construction of the filler pipe of the fuel tank described herein, a position of the discharge pipe and of the filler nozzle is achieved which permit not only a rapid and automatic filling of the tank but also protects the surface of the body of the motor vehicle against damages by the discharge pipe 13 or the fill nozzle adjoining the same.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A fuel tank with a rear wall for an automotive vehicle, comprising
    a filler pipe terminating in the upper portion on one side of the rear wall and having sections extending obliquely to the rear wall in a horizontal plane;
    a rectilinear rear section of the filler pipe extending rearwardly from said sections at an inclination and being provided with an opening for the insertion of a fuel discharge pipe;
    support means located in the opening defining an aperture of smaller area than that of the opening and providing a sufficient passage means for venting of air from the fuel tank, a portion of the opening being of larger area than the aperture defined by the support means being located to the rear of the support means as viewed in the inflow direction of fuel during a filling operation such that the fuel discharge pipe rests against a lower edge of the large area portion of the opening and an upper surface of the fuel discharge pipe rests against the support means;
    a vent pipe from the fuel tank terminating in the filler pipe to the rear of the support means as viewed in the inflow direction of the fuel; and
    the rear section having a lower inner wall with an inwardly formed step-like indentation as viewed in the inflow direction of fuel directly downstream of the lower inner surface of the opening upon which the fuel discharge pipe always rests during the filling operation so that fuel impinges the inner wall of the filler pipe at a relatively large distance from the fuel discharge pipe exit for an unimpaired inflow of fuel.

2. A fuel tank according to claim 1, wherein the interior cross-section of the vent pipe corresponds at least to the cross-section of the fuel jet leaving the fuel discharge pipe.

3. A fuel tank according to claim 1, wherein the vent pipe is provided with a conically flared inlet portion arranged approximately in the center of the fuel tank.

4. A fuel tank according to claim 3, wherein the interior cross-section of the vent pipe corresponds at least to the cross-section of the fuel jet leaving the fuel discharge pipe.

5. A fuel tank according to claim 4, wherein the largest cross-section of the conically flared inlet portion is in a ratio of about 1:1.4 to about 1:1.6 with respect to the interior cross-section of the vent pipe.

* * * * *